United States Patent
Xu et al.

(10) Patent No.: US 12,087,341 B2
(45) Date of Patent: Sep. 10, 2024

(54) MAGNETIC RECORDING MEDIUM AND MAGNETIC READ/WRITE APPARATUS

(71) Applicant: SHOWA DENKO K.K., Tokyo (JP)

(72) Inventors: Chen Xu, Chiba (JP); Lei Zhang, Chiba (JP); Takayuki Fukushima, Chiba (JP); Hisato Shibata, Chiba (JP); Takehiro Yamaguchi, Chiba (JP); Kazuya Niwa, Chiba (JP); Tomoo Shige, Chiba (JP); Hiroaki Nemoto, Chiba (JP); Yuji Umemoto, Chiba (JP); Hiroshi Koyanagi, Chiba (JP)

(73) Assignee: RESONAC CORPORATION, Tokyo (JP)

(*) Notice: Subject to any disclaimer, the term of this patent is extended or adjusted under 35 U.S.C. 154(b) by 23 days.

(21) Appl. No.: 16/862,809

(22) Filed: Apr. 30, 2020

(65) Prior Publication Data
US 2020/0357436 A1    Nov. 12, 2020

(30) Foreign Application Priority Data
May 9, 2019 (JP) .................. 2019-089202

(51) Int. Cl.
G11B 5/66 (2006.01)
G11B 5/65 (2006.01)
G11B 5/73 (2006.01)

(52) U.S. Cl.
CPC .......... G11B 5/73919 (2019.05); G11B 5/657 (2021.05); G11B 5/658 (2021.05)

(58) Field of Classification Search
CPC ..... G11B 5/73919; G11B 5/647; G11B 5/667; G11B 5/727; G11B 5/7364; G11B 5/7369; G11B 5/7373; G11B 5/73921
See application file for complete search history.

(56) References Cited

U.S. PATENT DOCUMENTS

| 8,582,416 B2 | 11/2013 | Kanbe et al. |
| 2007/0190364 A1 | 8/2007 | Das et al. |
| 2009/0130346 A1* | 5/2009 | Osawa ............. G11B 5/66 428/31 |

(Continued)

FOREIGN PATENT DOCUMENTS

| CN | 101022014 | 8/2007 |
| CN | 104303232 | 1/2015 |

(Continued)

OTHER PUBLICATIONS

English Machine Translation: Osawa (JP 2004-152424) (Year: 2004).*

*Primary Examiner* — Holly Rickman
*Assistant Examiner* — Linda N Chau
(74) *Attorney, Agent, or Firm* — IPUSA, PLLC

(57) ABSTRACT

A magnetic recording medium includes a substrate, an underlayer formed on the substrate, and a magnetic layer formed on the underlayer. The magnetic layer includes an alloy having a $L1_0$ structure. The underlayer includes a first underlayer and a second underlayer. The first underlayer includes Mo and Ru, the content of Ru in the first underlayer is in a range of 5 atom % to 30 atom %, and the second underlayer includes a material having a body-centered cubic (BCC) structure. The second underlayer is formed between the first underlayer and the substrate.

9 Claims, 2 Drawing Sheets

(56) References Cited

U.S. PATENT DOCUMENTS

| | | | |
|---|---|---|---|
| 2014/0064047 A1 | 3/2014 | Niwa et al. | |
| 2015/0049594 A1 | 2/2015 | Kanbe et al. | |
| 2015/0093598 A1* | 4/2015 | Kubota | G11B 5/65 428/831.2 |
| 2015/0179204 A1* | 6/2015 | Mosendz | G11B 5/7377 369/13.33 |
| 2019/0361054 A1 | 11/2019 | Hebiguchi et al. | |

FOREIGN PATENT DOCUMENTS

| | | | |
|---|---|---|---|
| JP | 2004152424 A | * | 5/2004 |
| JP | 2013-157071 | | 8/2013 |
| JP | 2014-049146 | | 3/2014 |
| WO | 2018/163685 | | 9/2018 |

* cited by examiner

MAGNETIC RECORDING MEDIUM AND MAGNETIC READ/WRITE APPARATUS

CROSS-REFERENCE TO RELATED APPLICATIONS

This application is based on and claims priority to Japanese Patent Application No. 2019-089202, filed on May 9, 2019, the entire contents of which are incorporated herein by reference.

BACKGROUND OF THE INVENTION

1. Field of the Invention

The disclosures herein generally relate to a magnetic recording medium and a magnetic read/write apparatus.

2. Description of the Related Art

In recent years, a heat-assisted recording method and a microwave-assisted recording method have been attracting attention as next-generation recording methods that can achieve an areal recording density of approximately 1 Tbit/inch$^2$. The above-described recording methods irradiate a magnetic recording medium with near-field light and locally heat the surface of the magnetic recording medium to reduce the coercivity of the magnetic recording medium when recording information.

When the heat-assisted recording method or the microwave-assisted recording method is used, it is possible to readily record information on the magnetic recording medium having a coercivity of several tens of kOe at ambient temperature by the recording magnetic field of a magnetic head. Therefore, a material having a high magnetocrystalline anisotropy constant (Ku) (a high Ku material) at a level of $10^6$ J/m$^3$ can be used for a magnetic layer. As a result, the size of magnetic grains can be reduced to 6 nm or less while maintaining thermal stability.

Examples of suitable high Ku materials include alloys having an $L1_0$ structure, such as FePt alloys (Ku of approximately $7 \times 10^6$ J/m$^3$) and CoPt alloys (Ku of approximately $5 \times 10^6$ J/m$^3$).

For a magnetic recording medium that includes a magnetic layer formed of an alloy having a $L1_0$ structure, a material having a body-centered cubic (BCC) structure, such as Cr, W, or Mo, and a material having a NaCl-type structure, such as MgO, are often used as materials constituting underlayers.

For example, in Patent Document 1, a Cr alloy, a Cr alloy, a Mo—Ru alloy, and MgO are used respectively as materials constituting a first underlayer, a second underlayer, a third underlayer, and a fourth underlayer, which are stacked in this order from the substrate side.

As described above, for a magnetic recording medium that includes a magnetic layer formed of the alloy having the $L1_0$ structure, a material having the BCC structure, such as Cr, W, or Mo, and a material having the NaCl-type structure, such as MgO, are often used as the materials constituting the underlayers. The reason is because lattice matching between the materials having the BCC structure and the NaCl-type structure, which have a (100) orientation, and the material having the $L1_0$ structure, which has a (001) orientation, is high.

In order to form the magnetic layer formed of the alloy having the $L1_0$ structure, the substrate needs to be heated to a high temperature prior to the formation of the magnetic layer. Further, as described above, the materials having the BCC structure and the NaCl-type structure are often used as the materials constituting the underlayers. These materials typically have high melting points, and are heated during the formation of the underlayers in many cases.

The inventors found that heating during the formation of the underlayers and heating prior to the formation of the magnetic layer cause the surface smoothness of the magnetic recording medium to decreases and the waviness to increase.

The inventors consider the reasons for the above problems as follows.

For a magnetic recording medium that includes a magnetic layer formed of an alloy having the $L1_0$ structure, the alloy having the $L1_0$ structure needs to have a high c-axis orientation ((001) orientation). Therefore, lattice matching between the materials constituting the underlayers and the alloy having the $L1_0$ structure is required to be high. The above-described underlayers typically have a laminate structure as it is difficult to form the underlayers as a single-layer structure. Specifically, it is necessary to improve lattice matching between a material constituting an uppermost layer of the plurality of underlayers, which are formed between the substrate and the magnetic layer, and the alloy having the $L1_0$ structure included in the magnetic layer, while also improving lattice matching between the materials constituting the underlayers and reducing lattice distortion.

However, the laminate structure of the plurality of underlayers is considered to be imperfect. In particular, as the crystallization of the materials constituting the underlayers progresses, lattice distortion occurs between the materials constituting the underlayers due to heating during the formation of the underlayers and heating prior to the formation of the magnetic layer. As a result, the surface smoothness of the magnetic recording medium decreases and the waviness increases.

RELATED-ART DOCUMENTS

Patent Documents

Patent Document 1: Japanese Laid-Open Patent Publication No. 2013-157071

SUMMARY OF THE INVENTION

It is a general object of the present invention to provide a magnetic recording medium having high surface smoothness with less waviness.

(1) A magnetic recording medium includes a substrate, an underlayer formed on the substrate, and a magnetic layer formed on the underlayer. The magnetic layer includes an alloy having a $L1_0$ structure. The underlayer includes a first underlayer and a second underlayer. The first underlayer includes Mo and Ru, the content of Ru in the first underlayer is in a range of 5 atom % to 30 atom %, and the second underlayer includes a material having a body-centered cubic (BCC) structure. The second underlayer is formed between the first underlayer and the substrate.

(2) The magnetic recording medium according to (1), wherein the first underlayer further includes one or more elements selected from the group consisting of V, W, Ta, and Nb.

(3) The magnetic recording medium according to (1), wherein the material having the BCC structure is Cr or a Cr alloy.

(4) The magnetic recording medium according to (1), wherein the second underlayer further includes one or more elements selected from the group consisting of Ti, V, Mo, W, Ru, and Mn.

(5) The magnetic recording medium according to (1), wherein the alloy having the $L1_0$ structure is a FePt alloy or a CoPt alloy (6) The magnetic recording medium according to (1), wherein the magnetic layer further includes one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, BN, and $HfO_2$.

(7) The magnetic recording medium according to (1), further comprising a third underlayer between the first underlayer and the magnetic layer. The third underlayer includes MgO.

(8) The magnetic recording medium according to (7), wherein the third underlayer further includes one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, SiC, VC, $B_4C$, $Si_3N_4$, VN, BN, TiN, and AlN.

(9) The magnetic recording medium according to (7), further comprising a fourth underlayer between the first underlayer and the third underlayer. The fourth underlayer includes an alloy having a BCC structure. The alloy having the BCC structure includes one or more elements selected from the group consisting of V, Mo, W, Ta, and Nb.

(10) A magnetic read/write apparatus includes the magnetic recording medium according to (1).

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
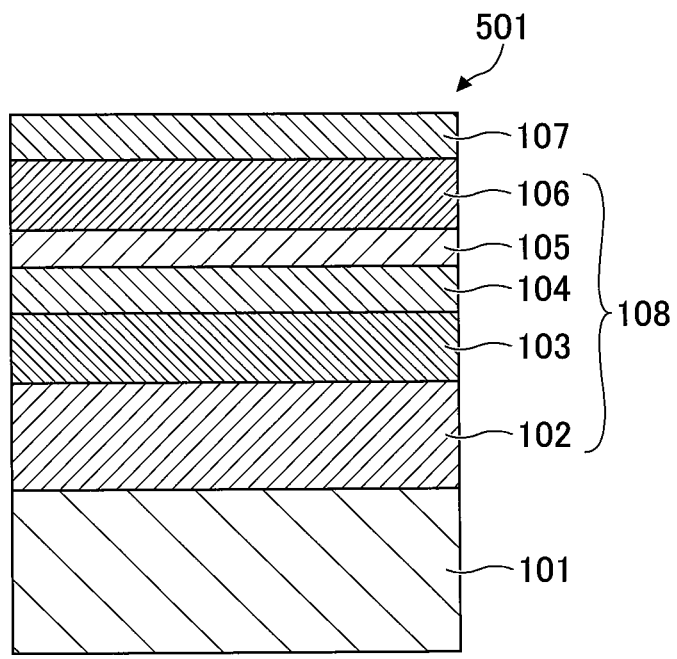
FIG. 1 is a cross-sectional view of an example layered structure of a magnetic recording medium according to an embodiment of the present invention.

According to an embodiment of the present invention, it is possible to provide a magnetic recording medium having high surface smoothness with less waviness.

In the following, a magnetic recording medium and a magnetic read/write apparatus according to embodiments of the present invention will be described in detail with reference to the accompanying drawings. In order to facilitate understanding of features, the depiction of certain elements in the figures may be enlarged, and the constituent elements illustrated in the drawings may not be to scale.

[Magnetic Recording Medium]

FIG. 1 illustrates an example layered structure of a magnetic recording medium according to an embodiment of the present invention.

A magnetic recording medium 501 includes a substrate 101, an underlayer 108 formed on the substrate 101, and a magnetic layer 107 formed on the underlayer 108. The magnetic layer 107 includes an alloy having a $L1_0$ structure. The underlayer 108 includes a first underlayer 104 and a second underlayer 103. The first underlayer 104 includes Mo and Ru, and the content of Ru in the first underlayer 104 is in a range from 5 atom % to 30 atom %. The second underlayer 103 includes a material having a BCC structure. The second underlayer 103 is formed between the first underlayer 104 and the substrate 101. Accordingly, the magnetic recording medium 501 has high surface smoothness with less waviness. Specifically, in the magnetic recording medium 501, the second underlayer 103, which includes the material having the BCC structure, the first underlayer 104, which includes Mo and Ru and whose Ru content is in the range of 5 atom % to 30 atom %, and the magnetic layer 107, which includes the alloy having the $L1_0$ structure, are stacked in this order from the substrate 101 side. Accordingly, lattice matching between the materials constituting the respective layers is improved. Therefore, even if the materials are subjected to a heating process during film formation, lattice distortion does not readily occur between the materials constituting the respective layers. As a result, the surface smoothness of the magnetic recording medium increases and the waviness decreases. Accordingly, spacing loss between the magnetic recording medium and a magnetic head can be reduced, thus increasing the signal-to-noise ratio (SNR) and the areal recording density of the magnetic read/write apparatus.

The content of Ru in the first underlayer 104 is in the range of 5 atom % to 30 atom %. The content of Ru in the first underlayer 104 is preferably in a range of 6 atom % to 20 atom %, and more preferably in a range of 8 atom % to 15 atom %. When the content of Ru in the first underlayer 104 is in the range of 5 atom % to 30 atom %, the surface smoothness of the magnetic recording medium 501 increases and the waviness of the magnetic recording medium 501 decreases.

The thickness of the first underlayer 104 is preferably in a range of 1 nm to 50 nm, and more preferably in a range of 3 nm to 30 nm. When the thickness of the first underlayer 104 is in the range of 1 nm to 50 nm, the surface smoothness of the magnetic recording medium 501 further increase and the waviness of the magnetic recording medium 501 further decreases.

The first underlayer 104 preferably includes one or more elements selected from the group consisting of V, W, Ta, and Nb. Accordingly, lattice matching between the materials constituting the respective layers is further improved. The total content of the above-described elements in the first underlayer 10 is preferably in a range of 1 atom % to 15 atom %, and more preferably in a range of 3 atom % to 9 atom %. When the total content of the above-described elements in the first underlayer 10 is in the range of 1 atom % to 15 atom %, it is possible to adjust the lattice spacing without impairing the crystallinity of the Mo—Ru alloy.

The material having the BCC structure, included in the second underlayer 103, is preferably chromium or an alloy thereof. Chromium or an alloy thereof has a BCC structure and is readily (100)-oriented. In addition, the material constituting the first underlayer 104 has also a BCC structure and is readily (100)-oriented. Accordingly, lattice matching between Cr or the Cr alloy included in the second underlayer 103 and the material constituting the first underlayer 104 is further improved. As a result, lattice matching between the materials constituting the respective layers is further improved.

The thickness of the second underlayer 103 is preferably in a range of 4 nm to 30 nm, and more preferably in a range of 8 nm to 15 nm. When the thickness of the second underlayer 103 is in the range of 4 nm to 30 nm, lattice matching between the material constituting the second underlayer 103 and the material constituting the first underlayer 104 is further improved. Accordingly, lattice matching between the materials constituting the respective layers is further improved.

It is preferable for the second underlayer 103 to further include one or more elements selected from the group consisting of Ti, V, Mo, W, Ru, and Mn. Accordingly, lattice matching between the materials constituting the respective layers is further improved.

The total content of the above-described elements in the second underlayer 103 is preferably in a range of 1 atom % to 15 atom %, and more preferably in a range of 3 atom % to 9 atom %. When the total content of the above-described elements in the second underlayer 103 is in the range of 1 atom % to 15 atom %, it is possible to adjust the lattice spacing without impairing the crystallinity of the Cr alloy.

The alloy having the $L1_0$ structure, included in the magnetic layer 107, is preferably a FePt alloy or a CoPt alloy. These alloys readily have a c-axis orientation with respect to the surface of the substrate 101, namely the (001) orientation. In addition, lattice matching with the materials constituting the underlayer 108 is further improved.

The thickness of the magnetic layer 107 is preferably in a range of 1 nm to 20 nm, and more preferably in a range of 3 nm to 15 nm. When the thickness of the magnetic layer 107 is 1 nm or more, the reproducing output of the magnetic recording medium can be improved. When the thickness of the magnetic layer 107 is 20 nm or less, the enlargement of crystal grains can be suppressed.

If the magnetic layer 107 has a multi-layer structure, the thickness of the magnetic layer 107 means the total sum of the thickness of each layer constituting the magnetic layer 107.

It is preferable for the magnetic layer 107 to further include one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, BN, and $HfO_2$. With the above configuration, the magnetic layer 107 can include a granular structure in which magnetic grains constituting the alloy having the $L1_0$ structure are surrounded by a grain boundary segregation material. Accordingly, the magnetocrystalline anisotropy and coercivity of the magnetic grains constituting the magnetic layer 107 can be further increased.

The content of the above-described materials in the magnetic layer 107 is preferably in a range of 25 vol % to 50 vol %, and more preferably in a range of 35 vol % to 45 vol %. When the content of the above-described materials in the magnetic layer 107 is in the range of 25 vol % to 50 vol %, the magnetocrystalline anisotropy and coercivity of the magnetic grains constituting the magnetic layer 107 can be further increased.

The magnetic recording medium 501 further includes a third underlayer 106 between the first underlayer 104 and the magnetic layer 107. The third underlayer 106 includes MgO. MgO has a NaCl-type structure and is readily (100)-oriented. Accordingly, lattice matching between MgO and a (100)-oriented material having a BCC structure is high. Further, the alloy having the $L1_0$ structure, included in the magnetic layer 107, can be (001)-oriented.

The thickness of the third underlayer 106 is preferably in a range of 1 nm to 10 nm, and more preferably in a range of 2 nm to 8 nm. When the thickness of the third underlayer 106 is in the range of 1 nm to 10 nm, the (001) orientation of the alloy having the $L1_0$ structure, included in the magnetic layer 107, is further enhanced.

It is preferable for the third underlayer 106 to further include one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, SiC, VC, $B_4C$, $Si_3N_4$, VN, BN, TiN, and AlN. With the above configuration, the magnetocrystalline anisotropy of the magnetic grains constituting the magnetic layer 107 is further increased, and lattice matching with the alloy having the $L1_0$ structure, included in the magnetic layer 107, is further improved.

The total content of the above-described materials in the third underlayer 106 is preferably in a range of 1 vol % to 15 vol %, and more preferably in a range of 3 vol % to 9 vol %. When the total content of the above-described materials in the third underlayer 106 is in the range of 1 vol % to 15 vol %, the magnetocrystalline anisotropy of the magnetic grains constituting the magnetic layer 107 is further increased, and lattice matching with the alloy having the $L1_0$ structure, included in the magnetic layer 107, is further improved.

The magnetic recording medium 501 further includes a fourth underlayer 105 between the first underlayer 104 and the third underlayer 106. The fourth underlayer 105 includes an alloy having a BCC structure. The alloy having the BCC structure preferably includes one or more elements selected from the group consisting of V, Mo, W, Ta, and Nb. Accordingly, lattice matching between the material constituting the first underlayer 104 and the material constituting the third underlayer 106 is improved.

The thickness of the fourth underlayer 105 is preferably in a range of 10 nm to 90 nm, and more preferably in a range of 30 nm to 70 nm. When the thickness of the fourth underlayer 105 is in the range of 10 nm to 90 nm, lattice matching between the material constituting the first underlayer 104 and the material constituting the third underlayer 106 is further improved.

In order to improve writing characteristics, the magnetic recording medium 501 further includes a soft magnetic underlayer 102 between the substrate 101 and the second underlayer 103. The soft magnetic underlayer 102 includes Co or Fe, and also a material having an amorphous or microcrystalline structure.

The material having the amorphous or microcrystalline structure, included in the soft magnetic underlayer 102, is preferably a soft magnetic alloy that further includes one or more elements selected from the group consisting of Ta, B, Si, Zr, Al, and C.

Examples of the soft magnetic alloy include a CoTaZr alloy, a CoNbZr alloy, a CoFeTaZr alloy, a CoFeTaB alloy, a CoFeTaSi alloy, a CoFeZrSi alloy, a CoFeZrB alloy, a FeAlSi alloy, and a FeTaC alloy.

The soft magnetic underlayer 102 may have a single-layer structure, or may have a laminate structure in which layers are antiferromagnetically coupled via a Ru layer.

Because the soft magnetic underlayer 102 allows the underlayer 108 to have a (100) orientation, the soft magnetic underlayer 102 may be formed between the first to fourth underlayers.

The thickness of the soft magnetic underlayer 102 is preferably in a range of 20 nm to 100 nm, and more preferably in a range of 40 nm to 80 nm.

Note that the magnetic recording medium 501 does not necessarily include the third underlayer 106, the fourth underlayer 105, and the soft magnetic underlayer 102, as appropriate.

The magnetic recording medium 50 may further include a protective layer on the magnetic layer 107.

Examples of the protective layer include a hard carbon film.

Examples of a method for forming the protective layer include a radio-frequency chemical vapor deposition (RF-CVD) method, an ion beam deposition (IBD) method, a filtered cathodic vacuum arc (FCVA) method. The RF-CVD method decomposes a source gas made of hydrocarbon by high-frequency plasma to form the protective layer. The IBD method ionizes a source gas by electrons emitted from a filament to form the protective layer. The FCVA method uses a solid carbon target to form the protective layer, without using a source gas.

The thickness of the protective layer is preferably in a range of 1 nm to 6 nm. When the thickness of the protective layer is 1 nm or more, floating properties of a magnetic head become satisfactory. When the thickness of the protective layer is 6 nm or less, the magnetic spacing decreases and the SNR increases.

A lubricant layer may be formed on the surface of the magnetic recording medium 501.

Examples of a lubricant include a perfluoropolyether-based lubricant.

Examples of a method for forming the lubricant layer includes a method for applying a lubricant.

The magnetic recording medium according to the embodiment of the present invention may be applied to a magnetic read/write apparatus such as a hard disk drive (HDD), and may preferably be applied to a magnetic read/write apparatus that employs a heat-assisted recording method or a microwave-assisted recording method.

[Magnetic Read/Write Apparatus]

Figure 2:
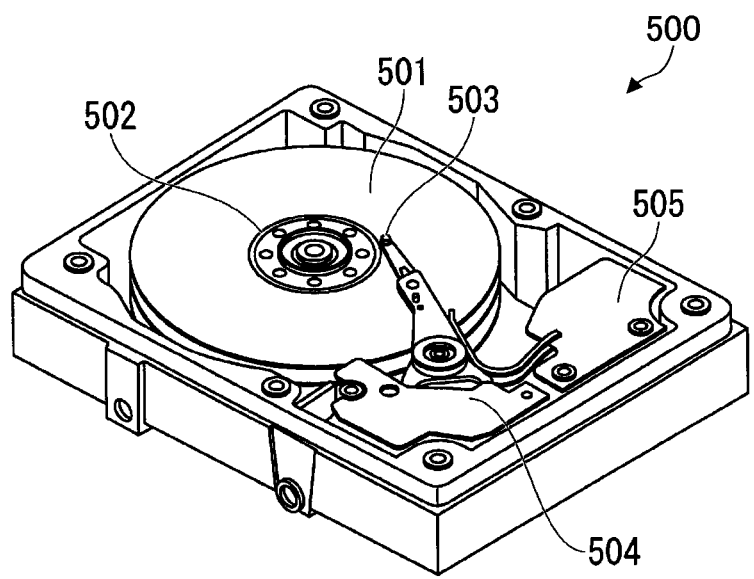
FIG. 2 is a perspective view of an example configuration of a magnetic read/write apparatus according to an embodiment of the present invention.

FIG. 2 illustrates an example configuration of a magnetic read/write apparatus according to an embodiment of the present invention.

A magnetic read/write apparatus 500 includes the magnetic recording medium 501, a medium drive unit 502 for rotating the magnetic recording medium 501, a magnetic head 503 for performing a reading operation and a writing operation on the magnetic recording medium 501, a head drive unit 504 for moving the magnetic head 503 relative to the magnetic recording medium 501, and a read/write signal processing system 505 for processing a read signal, input into the magnetic head 503, and also processing a write signal, output from the magnetic head 503.

Figure 3:
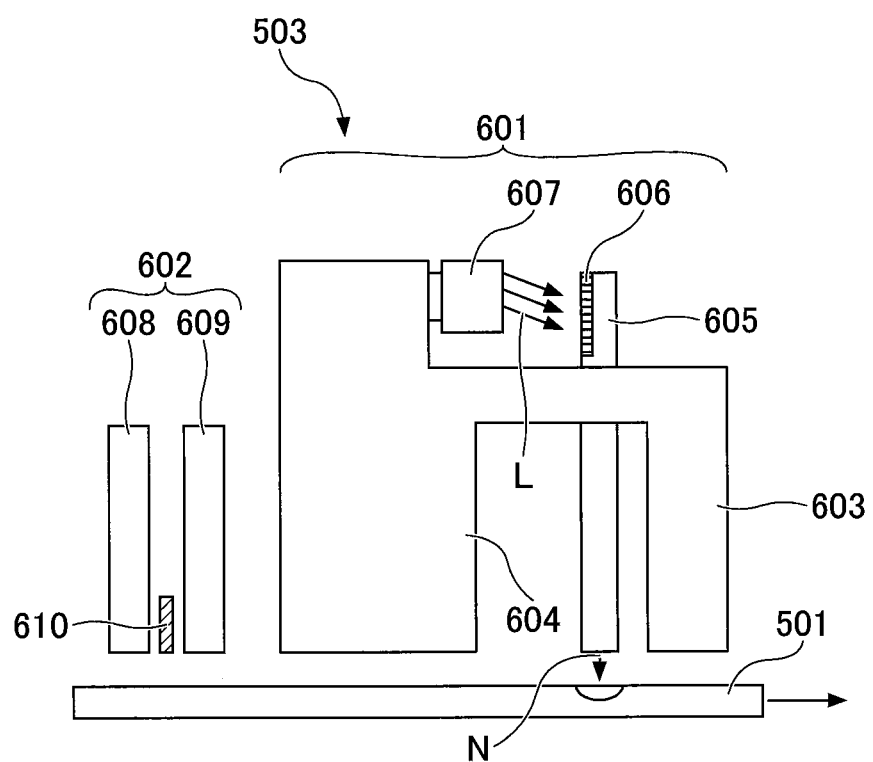
FIG. 3 is a schematic cross-sectional view of a structure of a magnetic head of FIG. 2.

FIG. 3 illustrates a structure of the magnetic head 503.

The magnetic head 503 includes a read head 601 and a write head 602.

The read head 601 includes a main magnetic pole 603, an auxiliary magnetic pole 604, and a planar solid immersion mirror (PSIM) 605 disposed between the main magnetic pole 603 and the auxiliary magnetic pole 604. The read head 601 radiates laser light L having a wavelength of 650 nm, which is emitted from a laser light source 607 (such as a laser diode), to a grading portion 606 of the PSIM 605, and records information by using near-field light N, generated from a front end portion (near-field light generating portion) of the PSIM 605, while also heating the magnetic recording medium 501.

The write head 602 includes a top shield 608, a bottom shield 609, and a TMR element 610 disposed between the top shield 608 and the bottom shield 609.

EXAMPLES

In the following, Examples and Comparative Examples of magnetic recording mediums will be described. Note that the inventive subject matter is not limited to the specifics of the Examples described below, and various variations and modifications may be made without departing from the scope of the present invention.

Example 1

A Cr-50 at % Ti alloy layer having a thickness of 100 nm and a Co-27 at % Fe-5 at % Zr-5 at % B alloy layer (soft magnetic underlayer) having a thickness of 30 nm were sequentially formed on a glass substrate. Next, after heating the glass substrate to a temperature of 250° C., a Cr layer (second underlayer) having a thickness of 10 nm, and a Mo-10 at % Ru layer (first underlayer) having a thickness of 10 nm, a W layer (fourth underlayer) having a thickness of 50 nm, and a MgO layer (third underlayer) having a thickness of 2 nm were sequentially formed on the Co-27 at % Fe-5 at % Zr-5 at % B alloy layer. Next, after heating the glass substrate to a temperature of 450° C., a Fe-55 at % Pt alloy layer (magnetic layer) having a thickness of 0.2 nm and a carbon layer (protective layer) having a thickness of 3 nm were sequentially formed on the MgO layer (third underlayer). In this manner, a magnetic recording medium was produced.

Examples 2 to 16 and Comparative Examples 1 to 3

Magnetic recording mediums were produced in the same manner as Example 1, except that the composition and the thickness of the first underlayer were varied as indicated in Table 1.

Next, the surface smoothness, the waviness, and the SNR of each of the magnetic recording mediums were evaluated.

[Surface Smoothness of Magnetic Recording Mediums]

An atomic force microscope (AFM) was used to measure the arithmetic average roughness (Ra) of each of the magnetic recording mediums, and the surface smoothness of each of the magnetic recording mediums was evaluated.

[Waviness of Magnetic Recording Mediums]

The atomic force microscope (AFM) was used to measure root mean square roughness (Rq) of each of the magnetic recording mediums, and the waviness of each of the magnetic recording mediums was evaluated.

[SNR]

The magnetic head illustrated in FIG. 3 was used to record an all-one pattern signal of a linear recording density of 1600 kFCI on each of the magnetic recording mediums, and the SNR was measured. The power supplied to the laser diode was adjusted such that a track width MWW, which was defined as the half width of a track profile, was 60 nm.

Table 1 indicates evaluation results of the surface smoothness, the waviness, and the SNR of each of the magnetic recording mediums.

TABLE 1

| | FIRST UNDERLAYER | | | | |
| --- | --- | --- | --- | --- | --- |
| | COMPOSITION | THICKNESS [nm] | Ra [nm] | Rq [nm] | SNR [dB] |
| EXAMPLE 1 | Mo-10 at % Ru | 10 | 0.26 | 0.36 | 9.02 |
| EXAMPLE 2 | Mo-5 at % Ru | 10 | 0.29 | 0.40 | 8.89 |
| EXAMPLE 3 | Mo-15 at % Ru | 10 | 0.26 | 0.37 | 8.98 |
| EXAMPLE 4 | Mo-20 at % Ru | 10 | 0.26 | 0.35 | 8.95 |
| EXAMPLE 5 | Mo-25 at % Ru | 10 | 0.30 | 0.35 | 8.77 |
| EXAMPLE 6 | Mo-30 at % Ru | 10 | 0.32 | 0.41 | 8.76 |
| EXAMPLE 7 | Mo-10 at % Ru | 2 | 0.30 | 0.39 | 8.81 |
| EXAMPLE 8 | Mo-10 at % Ru | 5 | 0.30 | 0.38 | 8.98 |
| EXAMPLE 9 | Mo-10 at % Ru | 20 | 0.27 | 0.35 | 9.18 |
| EXAMPLE 10 | Mo-10 at % Ru | 30 | 0.24 | 0.30 | 9.31 |
| EXAMPLE 11 | Mo-10 at % Ru | 40 | 0.24 | 0.28 | 9.29 |
| EXAMPLE 12 | Mo-10 at % Ru | 50 | 0.23 | 0.27 | 9.25 |
| EXAMPLE 13 | Mo-10 at % Ru-20 at % V | 10 | 0.29 | 0.36 | 9.01 |
| EXAMPLE 14 | Mo-10 at % Ru-20 at % W | 10 | 0.28 | 0.37 | 9.03 |
| EXAMPLE 15 | Mo-10 at % Ru-20 at % Ta | 10 | 0.27 | 0.36 | 8.99 |
| EXAMPLE 16 | Mo-10 at % Ru-20 at % Nb | 10 | 0.29 | 0.38 | 8.82 |
| COMPARATIVE EXAMPLE 1 | Mo | 10 | 0.32 | 0.43 | 8.69 |
| COMPARATIVE EXAMPLE 2 | Mo-2 at % Ru | 10 | 0.31 | 0.42 | 8.75 |
| COMPARATIVE EXAMPLE 3 | Mo-40 at % Ru | 10 | 0.32 | 0.42 | 8.69 |

As seen from Table 1, in Examples 1 to 16, the magnetic recording mediums had low Ra and Rq.

Conversely, in Comparative Examples 1 and 2, the content of Ru in the first underlayer was 0 to 2 atom %, and thus, the magnetic recording mediums had high Rq.

Further, in Comparative Example 3, the content of Ru in the first underlayer was 40 atom %, and thus, the magnetic recording medium had high Rq.

Further, the present invention is not limited to these embodiments, but various variations and modifications may be made to the described subject matter without departing from the scope of the present invention.

What is claimed is:

1. A magnetic recording medium comprising:
   a substrate;
   an underlayer formed on the substrate; and
   a magnetic layer formed on the underlayer, wherein
   the magnetic layer includes an alloy having a $L1_0$ structure,
   the underlayer includes
      a first underlayer including Mo and Ru, and one or more elements selected from the group consisting of V, W, and Nb, a content of Ru in the first underlayer being in a range of 6 atom % to 15 atom %; and
      a second underlayer including a material having a body-centered cubic (BCC) structure, the second underlayer being formed between the first underlayer and the substrate.

2. The magnetic recording medium according to claim 1, wherein the material having the BCC structure is Cr or a Cr alloy.

3. The magnetic recording medium according to claim 1, wherein
   the second underlayer further includes one or more elements selected from the group consisting of Ti, V, Mo, W, Ru, and Mn.

4. The magnetic recording medium according to claim 1, wherein
   the alloy having the $L1_0$ structure is a FePt alloy or a CoPt alloy.

5. The magnetic recording medium according to claim 1, wherein
   the magnetic layer further includes one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, $MnO$, $TiO$, $ZnO$, $C$, $BN$, and $HfO_2$.

6. The magnetic recording medium according to claim 1, further comprising
   a third underlayer between the first underlayer and the magnetic layer, the third underlayer including MgO.

7. The magnetic recording medium according to claim 6, wherein
   the third underlayer further includes one or more materials selected from the group consisting of $B_2O_3$, $SiO_2$, $TiO_2$, $Cr_2O_3$, $Al_2O_3$, $Ta_2O_5$, $ZrO_2$, $Y_2O_3$, $CeO_2$, $MnO$, $TiO$, $ZnO$, $C$, $SiC$, $VC$, $B_4C$, $Si_3N_4$, $VN$, $BN$, $TiN$, and $AlN$.

8. The magnetic recording medium according to claim 6, further
   a fourth underlayer between the first underlayer and the third underlayer, the fourth underlayer including an alloy having a BCC structure, wherein
   the alloy having the BCC structure includes one or more elements selected from the group consisting of V, Mo, W, Ta, and Nb.

9. A magnetic read/write apparatus comprising, the magnetic recording medium according to claim 1.

* * * * *